United States Patent [19]

Cerles et al.

[11] Patent Number: 5,037,878
[45] Date of Patent: Aug. 6, 1991

[54] AQUEOUS DISPERSIONS OF FUNCTIONALIZED SILICONES CROSSLINKABLE INTO ELASTOMERIC STATE

[75] Inventors: Bernard Cerles, Lyons; Michel Feder, Illfurth, both of France

[73] Assignee: Rhone-Poulenc Chimie, Courbevoie, France

[21] Appl. No.: 531,301

[22] Filed: May 31, 1990

[30] Foreign Application Priority Data

May 31, 1989 [FR] France .................. 89 07417

[51] Int. Cl.$^5$ ............ C08J 83/00; C08K 83/00
[52] U.S. Cl. ................. 524/588; 528/10; 528/14; 528/16; 528/19
[58] Field of Search ............ 528/10; 524/588

[56] References Cited

U.S. PATENT DOCUMENTS

| | | | |
|---|---|---|---|
| 2,891,920 | 6/1959 | Hyde | 524/714 |
| 3,294,725 | 12/1960 | Findlay et al. | 524/745 |
| 3,355,406 | 11/1967 | Cekada | 524/263 |
| 3,360,491 | 12/1967 | Axon | 528/10 |
| 3,697,469 | 10/1972 | Ikoma et al. | 524/837 |
| 4,221,688 | 9/1980 | Johnson et al. | 524/251 |
| 4,244,849 | 1/1981 | Saam | 524/442 |

FOREIGN PATENT DOCUMENTS

| | | |
|---|---|---|
| 0169098 | 6/1985 | European Pat. Off. . |
| 0202679 | 5/1986 | European Pat. Off. . |
| 0266729 | 11/1987 | European Pat. Off. . |
| 0277740 | 1/1988 | European Pat. Off. . |
| 57-125204 | 8/1982 | Japan . |
| 1217059 | 8/1989 | Japan . |

OTHER PUBLICATIONS

Sutherland, H. H. et al., "A Structural Investigation of Some Terminally Cyano-Subst. Side Chain Liquid--Crystalline Polysiloxanes" *Liquid Crystal*, 1988, vol. 3, No. 10, 1293–1300.

*Primary Examiner*—Harold D. Anderson
*Assistant Examiner*—T. Mosley
*Attorney, Agent, or Firm*—Burns, Doane, Swecker & Mathis

[57] ABSTRACT

Aqueous dispersions of a silicone, crosslinkable into elastomeric state upon removal of water therefrom under ambient conditions, well adapted for formulation into paints and for the production of silicone elastomer seals, include (A) 100 parts by weight of an oil-in-water emulsion containing a stabilizing amount of at least one anionic and/or nonionic surfactant and at least one alkoxylated diorganopolysiloxane, (B) an effective amount of an inorganic siliceous or nonsiliceous filler material, and (C) a catalytically effective amount of a metal curing catalyst.

17 Claims, No Drawings

AQUEOUS DISPERSIONS OF FUNCTIONALIZED SILICONES CROSSLINKABLE INTO ELASTOMERIC STATE

BACKGROUND OF THE INVENTION

1. Field of the Invention

The present invention relates to novel aqueous dispersions based on functionalized silicone oils that are crosslinkable into elastomeric state by removal of water therefrom.

2. Description of the Prior Art

Crosslinkable aqueous dispersions of the above type are known to this art in which the base silicone oil having silanol endgroups is prepared by emulsion polymerization.

Thus, U.S. Pat. No. 2,891,920 describes a process for the emulsion polymerization of polydiorganosiloxanes, employing an acidic or basic catalyst, in the presence of anionic, cationic or nonionic surface-active agents. This '920 patent relates that the emulsions obtained are stable in storage and, after the addition of fillers, can be used to formulate paints which provide a continuous coating by removal of water therefrom.

U.S. Pat. No. 3,294,725 describes, in particular, the use of dodecylbenzenesulfonic acid to polymerize polydiorganosiloxanes in emulsion. This '725 patent relates that to produce stable emulsions it is desirable to adjust the pH of these emulsions to a value of approximately 7. It also describes that an elastomeric coating can be obtained from these neutralized emulsions, to which colloidal silica and a polyalkoxysilane have been added.

U.S. Pat. No. 3,360,491 is similar to U.S. Pat. No. 3,294,725, except that the dodecylbenzenesulfonic acid is replaced with lauryl hydrogen sulfate.

U.S. Pat. No. 3,355,406 describes, inter alia, a silicone latex free of inorganic filler, comprising:

(i) a colloidal aqueous suspension of an $\alpha,\omega$-di(hydroxy)polydiorganosiloxane;

(ii) a silsesquioxane resin in the form of a colloidal suspension; and (iii) a catalyst selected from among inorganic acids, strong bases, dialkyltin diacylates and organic or inorganic peroxides.

U.S. Pat. No. 3,697,469 describes a particular process for the emulsion polymerization of polydiorganosiloxanes and indicates the possibility of adding colloidal silica and a tin salt to this emulsion in order to produce an elastomeric coating by water evaporation.

French Patent FR-A-2,110,358 describes a silicone emulsion having a pH of between 6.5 and 9, crosslinking into an electrically conductive elastomer after evaporation of water by incorporation of carbon black. The emulsion, which additionally contains a tin salt and a polyalkoxysilane, is not stable in storage and must be stored in two separate packages (two-component emulsion).

U.S. Pat. Nos. 4,221,688 and 4,244,849 and French Patent FR-A-2,463,163 describe silicone emulsions which are stable in storage and comprise:

(i) an anionically stabilized emulsion of an $\alpha,\omega$-di(hydoxy)polydiorganosiloxane polymer;

(ii) a siliceous filler;

(iii) a tin salt;

(iv) optionally, a nonreinforcing filler.

The siliceous filler may be a colloidal silica (U.S. Pat. No. 4,221,688), sodium silicate (U.S. Pat. No. 4,244,849) or an amorphous silica powder (FR-A-2,463,163).

U.S. Pat. No. 4,618,645 describes the preparation of an aqueous latex of polyorganosiloxane crosslinked by mixing a polydiorganosiloxane having silanol endgroups, a polyalkoxysilane and an anionic surfactant of the alkali metal sulfate or sulfonate type. The functionalized silicone resin or oil is then necessarily polymerized (in fact, polycondensed) by anionic catalysts until the desired molecular weight is attained, in the presence of sulfonic acid or hydrogen sulfate (according to the examples, for 5 hours at ambient temperature and at a pH below 5), and is then neutralized to pH above 7.

U.S. Pat. Nos. 4,608,412 and 4,618,642 describe the addition of polyalkoxysilanes to aqueous dispersions of organopolysiloxane oils having silanol endgroups.

As best as can be determined, the prior art aqueous silicone dispersions capable of crosslinking into elastomeric state by removal of water always have contained, as a base silicone oil having silanol endgroups, an oil polymerized in emulsion in the presence of an anionic catalyst, which preferably also serves as the surfactant.

However, these aqueous dispersions present a storage stability problem which is difficult to solve, since the best-known technical solutions involve storing the dispersions at a high pH. Such high pH can be incompatible with certain applications.

SUMMARY OF THE INVENTION

Accordingly, a major object of the present invention is the provision of novel aqueous dispersions of the above type, in which the base silicone oil having silanol endgroups, and polymerized in emulsion, is replaced by an emulsion of an already polymerized and alkoxy-functionalized silicone oil. Such novel aqueous dispersions modified in this fashion are stable in storage, and this storage-stability is unrelated to the pH. Furthermore, the pH of the novel aqueous dispersions of this invention can equally as well be acidic, neutral or basic, depending upon the nature of the filler and of the surfactants employed.

In addition, the elastomers produced from the subject novel aqueous dispersions, after the removal of water therefrom, exhibit mechanical properties of the same magnitude, or even better than those produced from the aqueous dispersions to date characterizing the state of this art.

Briefly, the present invention features aqueous dispersions of silicones that are crosslinkable into elastomeric state by removal of water therefrom under ambient conditions, comprising:

(A) 100 parts by weight of an emulsion of the oil-in-water type, stabilized by at least one surface-active agent selected from among anionic and nonionic surface-active agents and mixtures thereof, of at least one diorganopolysiloxane of the formula:

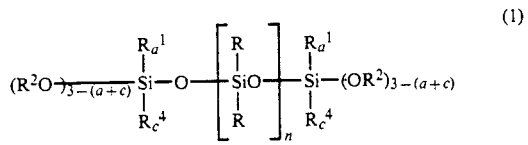

(1)

in which a is 0 or 1; c is 0 or 1; a+c=0 or 1; $R^1$ is an aliphatic, cyclic or aromatic, substituted or unsubstituted, $C_1$–$C_{13}$ saturated or unsaturated monovalent hydrocarbon radical, optionally containing an epoxy functional group or a primary, secondary or tertiary amine functional group; each $R^2$, which may be identical or different, is an aliphatic organic radical containing from 1 to 8 carbon atoms, selected especially from among alkyl radicals, alkyl ether radicals, alkyl ester radicals, alkyl ketone radicals, alkylcyano radicals and aralkyl radicals containing from 7 to 13 carbon atoms; $R^4$ is an aliphatic, cycloaliphatic or aromatic, substituted or unsubstituted, $C_1$-$C_{13}$ saturated or unsaturated monovalent hydrocarbon radical, with the proviso that $R^4$ may be identical with $R^1$; the radicals R, which may be identical or different, are each a monovalent hydrocarbon radical containing from 1 to 10 carbon atoms, optionally substituted by halogen atoms or cyano groups (the radicals R are preferably methyl, phenyl, vinyl and 3,3,3-trifluoropropyl radicals); and n is a number such that the polymer of formula (1) has a viscosity of 25 to 1,000,000 mPa.s at 25° C.;

(B) 5 to 250 parts by weight of an inorganic filler selected from among siliceous and nonsiliceous fillers;

(C) 0.01 to 5 parts by weight of a metal curing compound; said dispersions having a solids content of at least 40% and said surfactant not exerting any catalytic effect on the polymerization and/or polycondensation of the polydiorganosiloxane of formula (1).

DETAILED DESCRIPTION OF THE PREFERRED EMBODIMENTS OF THE INVENTION

More particularly according to the present invention, the oils of formula (1) are advantageously prepared by reacting an α,ω-di(hydroxy)polydiorganosiloxane of the formula:

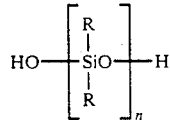

(2)

in which n and R are as defined above, with a polyalkoxysilane of the formula:

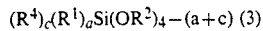

in which $R^1$, $R^2$, $R^4$, a and c are as defined above, preferably in the presence of a catalytically effective amount of catalyst (C). In said reactants, n has a sufficient value such that the polymers of formulae (1) and (2) have a viscosity of 25 to 1,000,000 mPa.s at 25° C., it being appreciated that the polymer of formula (1) may have an average formula in which the value of n is higher or lower than the value of n of the polymer of formula (2) which is reacted with the silane of formula (3).

Exemplary of the catalysts (C), particularly representative are:

(i) potassium acetate (U.S. Pat. No. 3,504,051);
(ii) various organic oxides (FR-A-1,495,011);
(iii) organic titanium derivatives (U.S. Pat. No. 4,111,890);
(iv) titanate plus amine (U.S. Pat. No. 3,647,846);
(v) alkoxyaluminum chelate (GB-A-2,144,758).

Exemplary of the above radicals R are:

(i) alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3pentafluorobutyl radicals;

(ii) cycloalkyl and halocycloalkyl radicals having from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(iii) alkenyl radicals having from 2 to 4 carbon atoms, such as vinyl, allyl and 2-butenyl radicals;

(iv) mononuclear aryl and haloaryl radicals having from 6 to 10 carbon atoms, such as phenyl, tolyl, xylyl, chlorophenyl, dichlorophenyl and trichlorophenyl radicals; and (v) cyanoalkyl radicals, the alkyl moieties of which have from 2 to 3 carbon atoms, such as β-cyanoethyl and τ-cyanopropyl radicals.

Specific examples of $R_2SiO$ recurring units comprising the alpha, omega-dihydroxydiorganopolysiloxanes of formula (2) include:

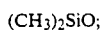

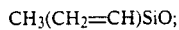

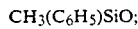

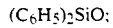

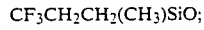

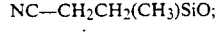

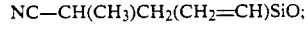

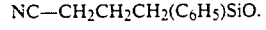

At least 80% of the radicals R are preferably methyl radicals.

It will be appreciated that to prepare the polymers of formula (1) it is possible to employ as the polymer of formula (2), a mixture of α,ω-di(hydroxy)diorganopolysiloxane polymers which differ from each other in molecular weights and/or in the nature of the radicals bonded to the silicon atoms. It will also be appreciated, moreover, that the polymers of formula (2) may optionally contain monoorganosiloxy recurring units $RSiO_{1.5}$ and/or $SiO_2$ recurring units, in the proportion of not more than 2% relative to the number of diorganosiloxy recurring units $R_2SiO$.

These α,ω-di(hydroxy)diorganopolysiloxane polymers are commercially available; in addition, they can easily be prepared by methods which are now well known to this art.

Among the polyalkoxysilanes of the formula $(R^4)_c(R^1)_aSi(OR^2)_{4-(a+c)}$ which can be employed, particularly representative are:

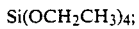

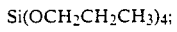

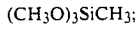

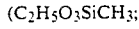

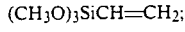

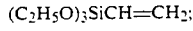

(CH₃O)₃SiCH₂—CH=CH₂;

(CH₃O)₃Si {CH₂—(CH₃)C=CH₂};

(C₂H₅O)₃Si(OCH₃);

Si(OCH₂—CH₂—OCH₃)₄;

CH₃Si(OCH₂—CH₂—OCH₃)₃;

CH₂=CHSi(OCH₂CH₂OCH₃)₃;

C₆H₅Si(OCH₃)₃;

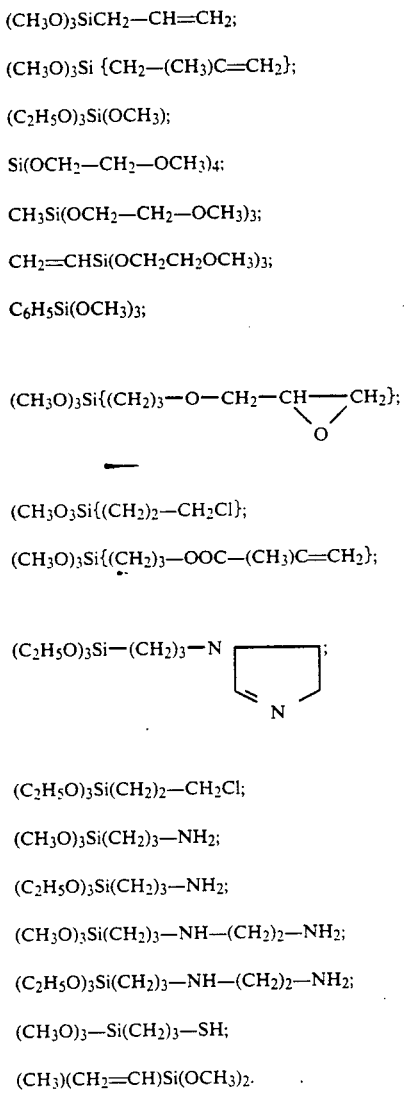

(CH₃O)₃Si{(CH₂)₂—CH₂Cl};

(CH₃O)₃Si{(CH₂)₃—OOC—(CH₃)C=CH₂};

(C₂H₅O)₃Si(CH₂)₂—CH₂Cl;

(CH₃O)₃Si(CH₂)₃—NH₂;

(C₂H₅O)₃Si(CH₂)₃—NH₂;

(CH₃O)₃Si(CH₂)₃—NH—(CH₂)₂—NH₂;

(C₂H₅O)₃Si(CH₂)₃—NH—(CH₂)₂—NH₂;

(CH₃O)₃—Si(CH₂)₃—SH;

(CH₃)(CH₂=CH)Si(OCH₃)₂.

The most typical such polyalkoxysilanes are: Si(OC₂H₅)₄; CH₃Si(OCH₃)₃; CH₃Si(OC₂H₅)₃; (C₂H₅O)₃Si(OCH₃); CH₂=CH—Si(OCH₃)₃; CH₃(CH₂=CH)Si(OCH₃)₂; CH₂=CH—Si(OC₂H₅)₃.

According to the present invention, it is recommended to employ as catalyst (D) lithium hydroxide of the formula LiOH or LiOH·H₂O preferably employed in solution in an alcohol, according to published French Patent Application 88/15,312, filed Nov. 4, 1988 and assigned to the assignee hereof.

According to this functionalization process, from 1 to 60 moles of polyalkoxysilane of formula (3) are generally employed per one mole of silanol (≡SiOH) group of the polydiorganosiloxane of formula (2) containing a hydroxyl group bonded to a silicon atom at each polymer chain end, the excess of this alkoxysilane (3) being proportionately greater the higher the molecular weight of the polydiorganopolysiloxane of formula (2).

By "catalytically effective amount" of lithium hydroxide is intended an amount such that the reaction rate is markedly improved and that the reaction temperature is as close as possible to room temperature, especially when using CH₃Si(OCH₃)₃, CH₂=CH—Si(OCH₃)₃ or MeViSi(OCH₃)₃ as a functionalizing agent. From 0.001 to 0.5 of lithium hydroxide is typically employed relative to 1 mole of silanol group ≡SiOH of the polydiorganosiloxane of formula (2), it being understood that to have 1 mole of ≡SiOH requires 0.5 moles of the polydiorganosiloxane of formula (2).

The process is carried out with protection against moisture, for example, in which a vacuum is produced and the air expelled is then replaced with a dry gas, for example nitrogen. The reactants and the catalyst are charged into the reactor and, when the functionalization reaction is complete, the catalyst is neutralized and optionally the reaction mass obtained is devolatilized to remove the alcohol formed during the functionalization reaction and the excess of the functionalizing agent (namely, the silane of formula (3)).

Many materials can be used to neutralize the functionalization catalyst (lithium hydroxide), for example trichloroethyl phosphate or dimethylvinylsilyl acetate. It is preferred, however, to use a silyl phosphate, such as, for example, those described in French Patent FR-A-2,410,004.

The devolatization is carried out, for example, at an absolute pressure ranging from 0.133 to 13.3 kPa.

Various processes can be employed to prepare the emulsion (A).

In a first process, the polymer (1) is mixed with the surface-active agent, it being possible for the latter to already be in aqueous solution, and water is then added, if necessary. The entirety is then converted into a fine and homogeneous emulsion by transferring it through a conventional colloid mill. The basic parameters of this first process are described, for example, in FR-A-2,064,563, FR-A-2,094,322, FR-A-2,114,230 and EP-A-169,098.

According to a second process, the surface-active agent and at least a fraction of the water are premixed at a temperature ranging from room temperature (20° C.) to 80° C. until a homogeneous mixture is obtained, then the organopolysiloxane is slowly added to the premix, while stirring vigorously at a temperature ranging from 20° to 80° C. The consistency of the resulting homogeneous emulsion is adjusted by adding water, if appropriate. The basic parameters of this second process are described, for example, in French Patents FR-A-2,471,210 and FR-A-2,485,923.

The anionic surface-active agents are advantageously selected from among the alkali metal alkyl benzenesulfonates, alkali metal alkylsulfates, alkali metal alkyl ether sulfates, alkali metal alkylaryl ether sulfates and alkali metal dioctylsulfosuccinates.

The nonionic surface-active agents are advantageously selected from among the polyethoxylated fatty acids, sorbitan esters, polyethoxylated sorbitan esters, polyethoxylated alkyl phenols, polyethoxylated fatty alcohols, polyethoxylated or polyglycerolated fatty amides, and polyglycerolated alcohols and alpha-diols.

A mixture of anionic and nonionic surfactants may, of course, be employed.

The emulsion preferably has a solids content of at least 40% by weight.

It is recommended to employ from 0.5 to 50 parts, preferably from 1 to 20 parts by weight of surfactant per 100 parts of polymer (1).

A more preferred surfactant is sodium dodecylbenzenesulfonate.

The aqueous dispersion according to the invention additionally contains from 5 to 250 parts, preferably from 10 to 100 parts by weight, of an inorganic filler (B)

selected from among the siliceous fillers and nonsiliceous fillers.

Reinforcing or semireinforcing fillers selected from among colloidal silica and pyrogenic and precipitated silica powders are recommended as a siliceous filler. It is also possible to employ natural siliceous fillers such as diatomaceous earths and ground quartz.

Precipitated calcium carbonate having a mean particle diameter of less than 0.1 μm is more particularly advantageous as a nonsiliceous filler.

In addition to ground natural calcium carbonate, the nonsiliceous filler employed may be carbon black, titanium dioxide, aluminum oxide, hydrated alumina, expanded vermiculite, unexpanded vermiculite, calcium carbonate, zinc oxide, mica, talc, iron oxide, barium sulfate and slaked lime, whether used alone or in admixture.

These fillers (B) are introduced into the emulsion (A) in the form of dry powder, for example by simple mixing.

In an alternative embodiment of the invention, it has been determined that if the filler (B) essentially comprises only a filler selected from among hydrated alumina, expanded vermiculite and unexpanded vermiculite in a concentration of 5 to 250, preferably of 50 to 200 parts by weight per 100 parts by weight of emulsion (A), an elastomer is produced which has a particularly high flame resistance, which cannot be obtained using the other aforementioned categories of filler (B), in particular with aluminum oxide or unhydrated alumina. Ceramic or aramid fibers may also be incorporated, according to EP-A-212,827.

The metal curing-catalyst compounds (C) are advantageously salts of carboxylic acids and halides of metals selected from among lead, zinc, zirconium, titanium, iron, tin, barium, calcium and manganese.

The constituent (C) is preferably a catalytic tin compound, typically an organotin salt, preferably introduced in the form of an aqueous emulsion. The organotin salts which are suitable are described, in particular, in the text by Noll, *Chemistry and Technology of Silicones*, Academic Press (1968), page 337.

The catalytic tin compound may also be the product of reaction of a tin salt, in particular of a tin dicarboxylate, with ethyl polysilicate, as described in U.S. Pat. No. 3,862,919.

It is also possible to thus employ the product of reaction of an alkyl silicate or of an alkyltrialkoxysilane with dibutyltin diacetate, as described in Belgian Patent BE-A-842,305.

The preferred tin salts are tin bischelates (EP-A-147,323 and EP-A-235,049), diorganotin dicarboxylates and in particular dibutyl- or dioctyltin diversatates (British Patent GB-A-,1,289,900), dibutyl- or dioctyltin diacetate and dibutyl- or dioctyltin dilaurate. From 0.01 to 3, preferably from 0.05 to 2, parts by weight of organotin salt are employed per 100 parts by weight of (A).

In a preferred embodiment, the aqueous dispersions according to the invention additionally contain, per 100 parts by weight of emulsion (A), from 10 to 180 parts by weight of an emulsion (D), of a polyorganosiloxane fluid (D$_1$) or organic fluid (D$_2$), with the objective of modifying the physical characteristics of the final dispersions and/or the mechanical properties of the elastomers produced from these dispersions.

The emulsions (D) preferably contain at least 40% by weight of solids.

The polyorganosiloxane fluids (D$_1$) more advantageously comprise:

(a) α,ω-bis(triorganosiloxy)diorganopolysiloxane and/or α-(hydroxy,ω-(triorganosiloxy)diorganopolysiloxane polymers having viscosities of at least 10 mPa.s at 25° C., essentially comprised of diorganosiloxy recurring units and not more than 1% of monoorganosiloxy and/or siloxy recurring units, the organic radicals bonded to the silicon atoms being selected from among methyl, vinyl and phenyl radicals, at least 60% of these organic radicals being methyl radicals and not more than 10% being vinyl radicals. The α,ω-bis(trimethylsiloxy)dimethylpolysiloxane oils having a viscosity ranging from 10 mPa.s to 1,000 mPa.s at 25° C. are preferably employed. These polymers, which serve as plasticizers, may be introduced in a proportion of not more than 150 parts, preferably from 5 to 120 parts by weight, per 100 parts by weight of the polymers of formula (1);

(b) liquid, branched methylpolysiloxane polymers containing from 1.4 to 1.9 methyl radicals per silicon atom, comprising a combination of recurring units of the formulae:

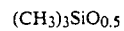

(CH$_3$)$_3$SiO$_{0.5}$

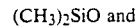

(CH$_3$)$_2$SiO and

CH$_3$SiO$_{1.5}$ containing from 0.1 to 8% of hydroxyl groups.

These may be prepared by hydrolysis of the corresponding chlorosilanes, as described in French Patents FR-A-1,408,662 and FR-A-2,429,811. Branched polymers whose recurring units are distributed according to the following ratios are preferably employed:

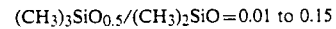

(CH$_3$)$_3$SiO$_{0.5}$/(CH$_3$)$_2$SiO=0.01 to 0.15 and  CH$_3$SiO$_{1.5}$/(CH$_3$)$_2$SiO=0.1 to 1.5.

These polymers may be introduced in a proportion not exceeding 70 parts, preferably of 3 to 50 parts by weight, per 100 parts by weight of the polymers of formula (1). They impart thixotropy properties thereto, especially with treated silicas;

(c) diorganopolysiloxane oils endblocked by hydroxyl groups and/or lower alkoxy groups having from 1 to 4 carbon atoms, having a viscosity which is in the range from 2 mPa.s to 40,000 mPa.s at 25° C. The organic radicals bonded to the silicon atoms of these oils are advantageously methyl radicals and not more than 10% are vinyl radicals.

Methoxy, ethoxy, isopropoxy, n-propoxy, n-butoxy, isobutoxy and tert-butoxy groups are representative of the lower alkoxy chain-blocking endgroups. The proportions of hydroxyl and/or alkoxy groups generally range from 0.5% to 20%. These oils are prepared according to the usual techniques, described more particularly in French Patents FR-A-938,292, FR-A-1,104,674, FR-A-1,116,196, FR-A-1,278,281 and FR-A-1,276,619. α,ω-dimethoxy- (or diethoxy-) dimethylpolysiloxane oils having a viscosity of 30 to 2,000 mPa.s at 25° C. are preferably employed. They may be introduced in a proportion of not more than 50 parts, preferably of 2 to 40 parts by weight, per 100 parts by weight of the polymers of formula (1).

These oils enable the chain length of the polymers of formula (1) to be extended.

The oils (c) correspond to the same formula (1), except that $a+c$ is equal to 2, $R_2$ may be H, and n typically ranges from 0 to 30.

The polymers (a), (b) and (c) may be totally or partially replaced by organic compounds (d) which are inert in respect of the constituents (A), (B), (C) and (D) of the aqueous dispersion. Exemplary of such organic compounds are the polyalkylbenzenes prepared by alkylation of benzene with long-chain olefins, in particular olefins having 12 carbon atoms produced by propylene polymerization. Organic compounds of this type are described, for example, in FR-A-2,392,476 and FR-A-2,446,849.

The emulsions (D) may be prepared using the same techniques and the same surfactants as those employed in the case of the emulsion (A).

However, the fluids (a), (b), (c) and (d) may be converted into aqueous emulsion simultaneously with the polymer (1) within the emulsion (A).

The aqueous emulsion (A) may additionally contain, per 100 parts by weight of diorganopolysiloxane of formula (1), from 0.1 to 20 parts by weight of a silane of the formula

$$(R^4)_c(R^1)_a Si(OR^2)_{4-(a+c)} \qquad (3)$$

in which $R^1$, $R^2$, $R^4$, a and c are as defined above.

This silane (3) is present or is added to the polymer (1) before it is converted into aqueous emulsion. Such silane (3) may therefore be identical with or different from the silane used for functionalizing the polymer of formula (2). This silane (3) enables the viscosity of the polymer (3) to be reduced, and this makes it easier to emulsify.

Furthermore, the silane (3) makes it possible to modify the physicochemical properties, in particular the adhesiveness, of the elastomer produced from the aqueous dispersion.

To prepare the aqueous dispersions according to this invention, it is recommended to first prepare the emulsion (A) containing the polymer (1) and, optionally, the silane (3) and the fluids (a), (b), (c) and (d), with the proviso that these fluids (a), (b), (c) and (d) may be emulsified, and the metal curing compound (C) is then added, preferably in the form of an aqueous emulsion, followed by the filler (B).

The final dispersion is homogenized and then degassed and is next sealed in a package which is impervious to atmospheric oxygen and water vapor.

The constituents (A), (B), (C) and optionally (D) are mixed in such amounts that the final dispersion has a solids content which is higher than 40%, preferably higher than 60%, but generally lower than 90%. The preferred pH may range from 4 to 13, depending on the nature of the surfactants and of the fillers.

The dispersions according to the invention may be used as paints which can be crosslinked into a thin layer. They then preferably have a solids content ranging from 40% to 70%.

To determine the solids content, 2 g of dispersion are placed into an aluminum weighing dish and this is heated to 150° C. for 1 hour in an oven provided with air circulation. After cooling, the dish is weighed again and the remaining material is determined as a percentage of the initial 2 g, which represents the solids content.

In another preferred embodiment, after being prepared, the dispersion according to the invention is subjected to a maturing stage, at room temperature, for a few hours to a few days.

This maturing (aging) stage entails merely permitting the dispersion to remain at rest protected against atmospheric oxygen before it is used.

The dispersions according to the invention may be employed for producing silicone elastomer seals, in particular for the construction industry.

These dispersions can also be employed for coating various pharmaceutical or plant-protection active agents formulated in a solid form (pellets, tablets, pills, and the like), for coating cork stoppers employed for sealing wine and spirit bottles, for producing coatings on kitchenware articles and, generally, on articles in contact with foodstuffs (for example loaf molds).

Known coating techniques can thus be used, in particular the techniques of coating with a brush and by dipping (by immersion), spraying techniques, fluidized bed coating techniques and immersion coating techniques.

A technique which is recommended in the case of cork stopper coating is the dipping technique, entailing immersing the stoppers in the dispersion which wets the surface thereof, and then evaporating off the water.

The coating obtained represents 20 to 50 mg of elastomer per 100 cm² of stopper surface. This layer makes it easier for the stopper to slide into the neck of the bottle during the bottling procedure and prevents "running", i.e., leakages of liquid between the neck and the stopper.

In order to further illustrate the present invention and the advantages thereof, the following specific examples are given, it being understood that same are intended only as illustrative and in nowise limitative.

In said examples to follow, as above, all parts and percentages are given by weight, unless otherwise indicated.

EXAMPLE 1

1(a). Preparation of the functionalized silicone oil

Into a reactor were introduced 100 g of an α,ω-dihydroxylated polydimethylsiloxane oil having a viscosity of 70,000 mPa.s at 25° C., 1 g of vinyltrimethoxysilane and 0.046 g of a solution containing 10% by weight of lithium hydroxide (LiOH.H₂O) in methanol; after 5 minutes of stirring at ambient temperature and under dry atmosphere, the reaction mixture was neutralized with 0.085 g of the reaction residue of silyl phosphate which had an equivalent phosphoric acid content of 12.5% and which was prepared according to the operating procedure of Example 2 of French Patent FR-A-2,410,004.

1(b). Emulsification 500 parts of the functionalized oil of Example 1(a), 80 parts of Maranil ® A55 sodium dodecylbenzenesulfonate and 420 parts of distilled water were introduced into a Moritz ® colloid mill and an emulsion (A) was obtained which had a solids content of 55.4% and a micelle diameter of 1.28 μm.

1(c). Preparation of the aqueous dispersions

Into a Meili ® type blade mixer were introduced, in this order: 200 parts of emulsion (A), 0.78 parts of aqueous emulsion (C) containing 37% by weight of di-n-octyltin dilaurate and 130 parts by weight of precipitated calcium carbonate having a mean particle size of 0.07 μm, an incorporation period of approximately 15 minutes being allowed in each case.

The resulting final dispersion was degassed for 30 minutes under a vacuum of 1.33 kPa.

The pH of the dispersion was 7.5 and its solids content was 73%.

The dispersion was packaged in a pack (cartridge) sealed against atmospheric oxygen and water vapor.

After 7 days of storage, the dispersion was spread with a blade into a thin layer (film) 2 mm in thickness, which was permitted to dry in the surrounding air for 10 days at 20° C. room temperature.

The following mean mechanical properties were measured on the dried films:

(1) the Shore A hardness (SAH) according to ASTM Standard D-2240;

(2) the tensile strength (T/S) according to AFNOR Standard T 46 002 corresponding to ASTM Standard D 412, in MPa;

(3) elongation at break (E/B) in % according to AFNOR Standard T 46 002;

(4) the modulus of elasticity (ME) at 100% elongation, according to AFNOR Standard T 46 002, in MPa.

The mechanical properties obtained are reported in the Table below.

EXAMPLES 2 AND 3

The operating procedure of Example 1 was repeated exactly, except that:

(i) in the case of Example 2, an α,ω-dihydroxylated polydimethylsiloxane oil having a viscosity of 20,000 mPa.s at 25° C. was employed and 100 parts of calcium carbonate were added to the emulsion (A);

(ii) in the case of Example 3, 20% by weight of the functionalized oil was replaced with a polydimethylsiloxane oil blocked by a trimethylsilyl group at each of its polymer ends, having a viscosity of 100 mPa.s at 25° C., and 140 parts of calcium carbonate were added to the emulsion (A).

The results obtained are also reported in the Table below:

TABLE

| EXAMPLES | 1 | 2 | 3 |
| --- | --- | --- | --- |
| SAH | 22 | 16 | 14 |
| T/S (MPa) | 1.40 | 1.44 | 1.01 |
| E/B % | 700 | 655 | 500 |
| ME (MPa) | 0.33 | 0.29 | 0.25 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous dispersion of a silicone crosslinkable into elastomeric state by removal of water therefrom under ambient conditions, comprising:

(A) 100 parts by weight of an oil-in-water emulsion which comprises a stabilizing amount of at least one anionic or nonionic surface-active agent or mixture thereof, at least one diorganopolysiloxane of the formula:

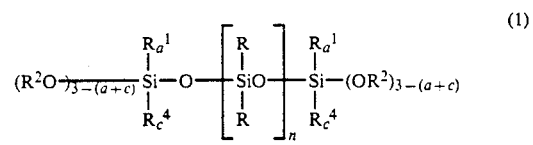

in which a is 0 or 1; c is 0 or 1; a+c is 0 or 1; $R^1$ is an aliphatic, cyclic or aromatic, substituted or unsubstituted, $C_1$–$C_{13}$ saturated or unsaturated monovalent hydrocarbon radical optionally containing an epoxy functional group or a primary, secondary or tertiary amine functional group; the radicals $R^2$, which are identical or different, are each an aliphatic organic radical having from 1 to 8 carbon atoms or an aralkyl radical having from 7 to 13 carbon atoms; $R^4$ is an aliphatic, cycloaliphatic or aromatic, substituted or unsubstituted, $C_1$–$C_{13}$ saturated or unsaturated monovalent hydrocarbon radical; the radicals R, which are identical or different, are each a monovalent hydrocarbon radical having from 1 to 10 carbon atoms, optionally substituted by halogen atoms or cyano groups; and n is a number such that the polymer of formula (1) has a viscosity of 25 to 1,000,000 mPa.s at 25° C.;

(B) 5 to 250 parts by weight of an inorganic siliceous or nonsiliceous filler;

(C) a catalytically effective amount of a metal curing catalyst;

said dispersion having a solids content of at least 40%, and said at least one surfactant exerting no catalytic influence on at least one of the polymerization and polycondensation of said polydiorganosiloxane of formula (1).

2. The aqueous silicone dispersion as defined by claim 1, said diorganopolysiloxane of formula (1) having been prepared by reacting an α,ω-di(hydroxy)polydiorganosiloxane of the formula:

with a polyalkoxysilane of the formula:

in the presence of a catalytically effective amount of lithium hydroxide.

3. The aqueous silicone dispersion as defined by claim 1, said at least one surfactant comprising sodium dodecylbenzenesulfonate.

4. The aqueous silicone dispersion as defined by claim 1, said emulsion (A) having a solids content of at least 40% by weight.

5. The aqueous silicone dispersion as defined by claim 1, said filler (B) comprising colloidal silica, pyrogenic silica, precipitated silica, diatomaceous earth, ground quartz, calcium carbonate, carbon black, titanium dioxide, aluminum oxide, hydrated alumina, expanded vermiculite, unexpanded vermiculite, zinc oxide, mica, talc, iron oxide, barium sulfate, slaked lime, or admixture thereof.

6. The aqueous silicone dispersion as defined by claim 5, said filler (B) comprising a precipitated calcium carbonate having a mean particle diameter of less than 0.1 μm.

7. The aqueous silicone dispersion as defined by claim 1, said metal catalyst (C) comprising an aqueous emulsion of an organotin salt.

8. The aqueous silicone dispersion as defined by claim 1, further comprising from 10 to 180 parts by weight of an emulsion (D) of a polyorganosiloxane fluid ($D_1$) which comprises at least one of the following polymers (a), (b) and (c):
(a) an α,ω-bis(triorganosiloxy)diorganopolysiloxane and/or an α-(hydroxy),ω-(triorganosiloxy)diorganopolysiloxane polymer having a viscosity of at least 10 mPa.s at 25° C., essentially comprising diorganosiloxy recurring units and not more than 1% of monoorganosiloxy and/or siloxy units, the organic radicals bonded to the silicon atoms being methyl, vinyl or phenyl radicals, at least 60% of such organic radicals being methyl radicals and not more than 10% being vinyl radicals;
(b) a liquid, branched methylpolysiloxane polymer containing from 1.4 to 1.9 methyl radicals per silicon atom, comprising a combination of recurring units of the formulae:

$(CH_3)_3SiO_{0.5}$ $(CH_3)_2SiO$ and $CH_3SiO_{1.5}$ and from 0.1 to 8% of hydroxyl groups;
(c) a diorganopolysiloxane oil endblocked by at least one of hydroxyl groups and lower alkoxy groups having from 1 to 4 carbon atoms, having a viscosity ranging from 2 mPa.s to 40,000 mPa.s at 25° C., and the organic radicals bonded to the silicon atoms thereof being methyl radicals and not more than 10% of vinyl radicals.

9. The aqueous silicone dispersion as defined by claim 1, further comprising a polyalkylbenzene.

10. The aqueous silicone dispersion as defined by claim 1, said emulsion (A) further comprising, per 100 parts by weight of the diorganopolysiloxane of formula (1), from 0.1 to 20 parts by weight of a silane of the formula:

$$(R^4)_c(R^1)_aSi(OR^2)_{4-(a+c)} \qquad (3)$$

in which $R^1$, $R^2$, $R^4$, a and c are as defined in formula (1).

11. The aqueous silicone dispersion as defined by claim 1, wherein the at least one diorganopolysiloxane of formula (1), $R^2$ is an alkyl, alkyl ether, alkyl ester, alkyl ketone or alkylcyano radical.

12. A substrate provided with a coating of the aqueous silicone dispersion as defined by claim 1.

13. The substrate as defined by claim 12, comprising a coated pharmaceutical or agrochemical.

14. A paint composition comprising the aqueous silicone dispersion as defined by claim 1.

15. A food-contacting substrate coated with the aqueous silicone dispersion as defined by claim 1.

16. The aqueous silicone dispersion as defined by claim 1, in crosslinked elastomeric state.

17. A substrate provided with a coating of the elastomer as defined by claim 16.

* * * * *